United States Patent [19]

Kawahata et al.

[11] Patent Number: 5,019,202

[45] Date of Patent: May 28, 1991

[54] PROCESS FOR PRODUCING DECORATIVE SHEETS HAVING EMBOSSED PATTERN

[75] Inventors: Ichiro Kawahata, Itabashi; Takashi Matano, Miyoshi; Hideki Kato, Shiki; Mutsuo Shima, Sayama, all of Japan

[73] Assignee: Dai Nippon Insatsu Kabushiki Kaisha, Tokyo, Japan

[21] Appl. No.: 283,848

[22] Filed: Dec. 13, 1988

[30] Foreign Application Priority Data

| | | | |
|---|---|---|---|
| Dec. 15, 1987 | [JP] | Japan | 62-316783 |
| Dec. 15, 1987 | [JP] | Japan | 62-316784 |
| Dec. 28, 1987 | [JP] | Japan | 62-333490 |

[51] Int. Cl.[5] .......... B32B 31/00

[52] U.S. Cl. .......... 156/277; 101/488; 101/491; 106/20; 156/280; 427/258; 427/261; 428/203

[58] Field of Search .......... 156/277, 280; 101/488, 101/491; 427/258, 261; 428/203; 106/20

[56] References Cited

U.S. PATENT DOCUMENTS

| | | | |
|---|---|---|---|
| 3,506,467 | 4/1970 | Ulrich | 427/258 |
| 3,823,046 | 7/1974 | Yamagishi | 427/258 |

FOREIGN PATENT DOCUMENTS

| | | | |
|---|---|---|---|
| 51-19063 | 2/1976 | Japan | 427/261 |

*Primary Examiner*—John J. Gallagher
*Attorney, Agent, or Firm*—Parkhurst, Wendel & Rossi

[57] ABSTRACT

A process for producing decorative sheets having an embossed pattern corresponding to a printed pattern layer, the process including the steps of: (a) forming a printed pattern layer on a base paper of the decorative sheet by use of a printing ink containing (i) a curing agent or a polymerization catalyst and (ii) a curable rein, the curing or catalytic action of the curing agent and polymerization catalyst being blocked and thereby inactivated, the printing ink being liquid repellant; (b) releasing the blocked state of the curing agent or polymerization catalyst thereby curing the curable resin in the printed pattern layer; (c) coating the whole surface of the printed pattern layer with a coating agent for formation of a top coating layer; and (d) solidifying the coating agent thereby forming the top coating layer of which the portions corresponding to the liquid repellant printed pattern layer are concaved.

7 Claims, No Drawings

PROCESS FOR PRODUCING DECORATIVE SHEETS HAVING EMBOSSED PATTERN

BACKGROUND OF THE INVENTION

This invention relates to a process for producing decorative sheets to be used for various construction materials, furnitures, etc. The decorative sheet has a top coating layer having sharp concavities formed on the surface thereof by utilizing the liquid repellent performance possessed by the printed pattern layer contains a curable resin as the vehicle. The present invention also provides a process for producing decorative sheets having sharp concavities on the top coating layer at the portion corresponding to the printed pattern layer, and while also having excellent performances of solvent resistance, water resistance, abrasion resistance, weathering resistance and heat resistance, and further having excellent properties for smoothness of the surface of the decorative plate. The present invention further relates to a process for producing decorative plates using the above-described above decorative sheets.

A decorative plate having an unevenness effect corresponding to the printed pattern layer attached on a paper for a decorative sheet revealed thereon has been frequently used as a decorative plate since it can exhibit excellent design characteristics due to the corresponding embossed effect.

The method for obtaining a decorative plate having the above corresponding embossed effect may include:

1) the method in which a decorative sheet having a printed pattern layer is applied with embossing with a pattern pressing plate or a pattern pressing roll corresponding to the above printed pattern layer, and then the decorative sheet is laminated on a substrate for the decorative plate;
2) the method in which a decorative sheet having a corresponding embossing is obtained by a combination of a printed pattern layer with a printing ink having the action of inhibiting curing of the curable resin during formation of the top coating layer and a curable resin for formation of the top coating layer, and then the decorative sheet is laminated on a substrate for the decorative plate;
3) the method in which a decorative sheet having a corresponding embossing obtained by a combination of a printed pattern layer with a printing ink having the action of promoting curing of the curable resin during formation of the top coating layer and a curable resin for formation of the top coating layer, and then the decorative sheet is laminated on a substrate for the decorative plate;
4) the method in which a decorative sheet having a corresponding embossing is obtained by a combination of a printed pattern layer having good permeability to the resin liquid to be used during formation of the top coating layer and a resin liquid for formation of the top coating layer, and then the decorative sheet is laminated on a substrate for the decorative plate;
5) the method in which a decorative sheet having a corresponding embossing is obtained by a combination of a printed pattern layer having the action of inhibiting permeability to the resin liquid to be used during formation of the top coating layer and a resin liquid for formation of the top coating layer, and then the decorative sheet is laminated on a substrate for the decorative plate;
6) the method in which a coating agent for formation of a top coating layer is coated and solidified on a base paper for a decorative sheet having a printed pattern layer, and then printing is effected on the top coating layer obtained with a printing ink containing a large amount of an extender pigment at a predetermined portion, thereby forming the decorative sheet with the printed portion on the top coating layer being made a convex portion by the above extender pigment, and the decorative sheet is laminated on a substrate for the decorative plate;
7) the method in which a printed pattern layer having a liquid repellent performance is formed on a base paper for a decorative sheet, and then on the printed surface is coated and solidified a coating agent for formation of top coating layer, thereby forming a coating layer with the portion corresponding to said printed pattern layer being made concave through the liquid repellent performance possessed by the above printed pattern layer, and the decorative sheet obtained is laminated on a substrate for the decorative plate.

Whereas, of the prepartion methods of the decorative plate having the effect of corresponding embossed effect of the prior art as described above, the method for preparing the decorative plate described in the above 1) can add an embossing corresponding to the printed pattern layer only with difficulty.

On the other hand, the methods for preparing the decorative plates described in the above 2) to 5) have drawbacks such that the depth of embossing is unstable, and yet that the scope of choice of the resin for a vehicle in the printing ink for formation of the printed pattern layer and the resin for formation of top coating is narrow, etc.

Furthermore, in the method utilizing a printing ink containing a large amount of an extender pigment of 6), the embossing effect is substantially visual, whereby not only is steric depth lacking, but also there is the limitation that the decorative plate obtained has a portion with a dense coloration degree formed necessarily at the convex portions, and yet a printed pattern with a printing ink containing a large amount of an extender pigment is formed on the outermost surface in the decorative plate. Therefore, drawbacks are involved in the surface characteristics of the decorative sheet. Furthermore, in the case where the vehicle in the printing ink used during formation of the printed pattern layer exhibiting the above liquid repellent action is a curable resin, since the curing reaction proceeds during the printing step, the viscosity of the printing ink changes depending on the degree of the curing reaction, whereby the amount of the printing ink attached in the printed pattern layer or the attachment strength becomes varied.

Consequently, the liquid repellent performance of the printed pattern layer obtained will become unstable, thus having the drawback that the unevenness effect in the decorative sheet will become nonuniform. On the other hand, in the case where the vehicle in the above printing ink is a curable resin, and also an acid catalyst, etc. for promoting curing of the above resin, is added in the printing ink, corrosion or abrasion of the plate or doctor during the printing step cannot be avoided, whereby the amount of the printing ink attached for forming the printed pattern layer may change in the course of printing or the attached portion may become inprecise, thus having the drawback that the unevenness effect obtained becomes unstable and an uneveness effect of good quality cannot be obtained.

Furthermore, the method utilizing the liquid repellent performance possessed by the printed pattern layer of the above 7) has the drawbacks such that the interpaper strength of the decorative sheet obtained is not sufficient, and that a product having excellent surface characteristics such as abrasion resistance cannot be obtained.

Furthermore, the method utilizing the liquid repellent performance possessed by the printing pattern layer of the above 7) has the drawbacks such that the amount of the coating agent coated during formation of the top coating layer is limited to give a product that does not have excellent surface characteristics such as abrasion resistance.

Also, in any of the methods for producing the decorative plate of the prior art as described above, a top coating layer is formed onto the base paper for a decorative sheet attached with a printed pattern layer, and therefore the amount of the resin utilized for formation of the top coating layer is of itself limited. As a result the sensation of unevenness of the obtained embossing is poor, and a product having excellent quality in physical properties cannot be obtained. Additionally since a decorative sheet having a top coating layer is laminated onto a substrate for decorative plate, there is the drawback such that the a decorative plate has a defect in surface smoothness due to the surface irregularity of the substrate.

In contrast, the process of the present invention is a process for producing a decorative sheet having a corresponding embossed effect which comprises utilizing the liquid repellent performance possessd by the printed pattern layer with a curable type resin, thereby forming a top coating layer with the portion corresponding to said printed pattern layer. Curing of the curable resin as a vehicle in the printing ink is accomplished after applying the printing ink on base paper for a decorative sheet, without the progress of the curing reaction of the curable resin utilized as the vehicle in the printing ink. Also, the curing agent or catalyst is maintained neutral during printing, and therefore there is no corrosion, abrasion, etc. of the plate or doctor to give stable printed pattern layer. Thus, it is intended to provide a process for producing a decorative sheet which can produce a decorative sheet with sharp concavities at the surface of the decorative sheet, and with good efficiency and yet stability, and also a process for producing decorative plates using the decorative sheet.

SUMMARY OF THE INVENTION

The process for producing decorative sheets having an embossed pattern of the present invention comprises forming a printed pattern layer with its action being due to a printing ink containing a blocked curing agent or catalyst and a curable resin as a vehicle on a base paper for the decorative sheet, then curing the curable resin in said printed pattern layer by releasing blocking of the curing action or the catalytic action in the curing agent or catalyst in said printed pattern layer. Thereafter a coating agent for the formation of a top coating is coated the whole surface of the printed pattern surface layer of the base paper for the decorative sheet having said printed pattern layer. The coating is the solidified thereby forming a top coating layer of which the portions corresponding to said printed pattern layer are made concave.

Furthermore, in the present invention, prior to forming the top coating layer as described above, there may be also included the steps of impregnating the base paper for the decorative sheet attached with the above printed pattern layer with a resin liquid for impregnation and drying the impregnated product.

Also, the method for preparing the decorative plate of the present invention, in the preparation steps for forming the above decorative sheet, comprises plastering together the base paper for the decorative sheet attached with said printing pattern layer, and a substrate for a decorative plate separately prepared with an adhesive interposed therebetween prior to formation of the above coating layer, thereby obtaining a decorative plate comprising a laminate with the surface having the printed pattern layer in said base sheet for the decorative sheet being made the outer surface.

DETAILED DESCRIPTION OF THE INVENTION

Production process (I)

The process for producing the decorative sheet having an embossed pattern of the present invention produces a decorative sheet having an uneven surface by corresponding embossing according to the steps of forming a printed pattern layer with the use of a curable resin containing a curing agent of which curing action is blocked or a catalyst of which catalytic action is blocked as the vehicle on a base paper for the decorative sheet; curing the curable resin in the above printed pattern layer by releasing blocking of the curing action or the catalytic action in the curing agent or catalyst in the printed pattern layer applied on the above base paper for the decorative sheet; and coating and solidifying a coating agent for formation of top coating layer on the whole surface of the printed pattern surface layer of the base paper for the decorative sheet having said printed pattern layer, thereby forming a top coating layer of which the portions corresponding to said printed pattern layer are made concave through the liquid repellent performance possessed by the above printed pattern layer.

In the first step in the process for producing the decorative sheet of the present invention, on a base paper for the decorative sheet, for example, a construction material print base paper with a basis weight of about 20 to 70 $g/m^2$, an interpaper reinforced paper comprising a synthetic resin internally added paper with a basis weight of about 20 to 70 $g/m^2$, construction material base paper for a synthetic resin impregnation with a basis weight of about 20 to 200 $g/m^2$, etc., a printed pattern layer is formed with a printing ink containing a curable resin as the vehicle, and the above printed pattern layer is not a printed layer by solid printing, but is formed as partially printed pattern layer.

In the printing ink for forming the above printed pattern layer, a curing agent for curing the curable resin used as the above vehicle or a polymerization catalyst for said curable resin is contained with its action under a blocked state, and the step of activating the curing action of the curing agent or the catalytic action of the catalyst is applied by releasing the above blocking, thereby initiating curing of the curable resin in the printed pattern layer. By doing so, plate clogging in the printing machine caused by the active action of the curing agent or the catalyst in the printing ink or abrasion or corrosion of doctor or plate can be inhibited, and therefore even in the case of employing a printing ink containing a curing agent or a having an active action for abrasion, corrosion, etc. of printing ink, doctor or plate which may cause plate clogging to occur in a printing machine, there exists the merit that a decorative sheet having a corresponding embossed pattern of good quality can be produced stably over a long time. When a printing ink containing the blocked curing agent or catalyst is used, the above step of releasing blocking may be of course performed after the step of adhesion between the base paper for decorative sheet and the substrate for decorative plate and prior to formation of the top coating layer.

Also, in the case of initiating curing of the curable resin in the printed pattern layer, by containing the curing agent or the polymerization catalyst for the curable resin utilized as the vehicle in the printing ink with its action being under the blocked state, and providing the step of releasing of the blocking after completion of the printing step, as described above, examples of the combination of the curable resin used in the above printing ink, the (blocked) curable resin or catalyst with its action being under the blocked state and the method of releasing blocking of said curing agent or catalyst, may include those as shown below.

| Curable resin | Blocked curing agent or catalyst | Method of releasing blocking |
|---|---|---|
| Melamin resin<br>Urea resin<br>Alkyd resin | amine salt of sulfonic acid [*1] | Heating |
| Urethane resin | Addition compound of blocking agent and isocyanate [*2] | Heating (sometimes in combination with releasing catalyst) |
| Epoxy resin | Microencapsulated amine compound [*3] | Disintegration of capsule (pressurization, heating, etc.) |

[*1] Dinonylnaphthalene Sulfonic Acid, Dinonylnaphthalene Disulfonic Acid, p-Toluenesulfonic Acid, Dodecylbenzene Sulfonic Acid, etc.
[*2]

The addition and dissociation reaction between a blocking agent $R^1H$ and an isocyanate compound RNCO: $R—NCO + R^1H \rightarrow R—NHCO—R^1$ is utilized, and when the dissociation reaction is effected in the absence of a catalyst, heating to 180°-200° C. or higher is required, but when a dissociation catalyst comprising, for example, an amine, an organic compound, a metal soap, etc. is permitted to act, dissociation is possible at a temperature of 160° C. or lower.

Examples of the compound $R^1H$ which is the blocking agent for RNCO may include the following compounds. Phenol type: phenol, cresol, xylenol, p-ethylphenol, o-isopropylphenol, p-tert-butylphenol, p-tert-octylphenol, thymol, p-naphthol, p-nitrophenol, p-chlorophenol;

Alcohol type: methanol, ethanol, propanol, butanol, ethylene glycol, methyl cellosolve, butyl cellosolve, methyl carbitol, benzyl alcohol, phenyl cellosolve, furfuryl alcohol, cyclohexanol;

Active methylene type: dimethyl malonate, diethyl malonate, ethyl acetoacetate;

Mercaptan type: butyl mercaptan, thiopheol, tert-dodecyl mercaptan;

Acid amide type: acetanilide, acetanisidide, acetic acid amide, benzamide;

Imide type: succinimide, maleinimide;

Amine type: diphenylamine, phenylnaphthylamine, aniline, carbazole;

Imidazole type: imidazole, 2-ethylimidazole;

Urea type: urea, thiourea, ethyleneurea;

Carbamic acid salt type: phenyl N-phenylcarbamate, 2-oxazolidone;

Imine type: ethyleneimine;

Oxime type: formaldoxime, acetaldoxime, methyl ethyl ketooxime, cyclohexanone oxime;

Sulfite type: sodium bisulfite, potassium bisulfite.

[*3]

For the material for capsules, gelatin, cellulosic materials, electrolyte polymers, etc. may be employed.

In the printing ink to be used in the above first step, there may be added liquid repellent materials for enhancing the liquid repellent performance of the printed pattern layer obtained, for example, silicone, wax, fluorine resin, etc., in an amount of about 5 to 30% by weight as the solid component in the printing ink composition as a matter of course. Also, when as the above printing ink, an ink composition containing an inorganic pigment such as silica, etc. in said ink is used, a decorative plate exhibiting an excellent gloss matte effect, i.e., an excellent quasi-embossing effect due to the variation of the gloss, can be obtained.

Formation of the printed pattern layer with the above printing ink may be practiced by conventional printing means such as gravure printing, off-set printing, letterpress printing, screen printing, etc., and when the vehicle in the above printing ink is, for example, a curable resin comprising a thermosetting, electron beam curable or UV-ray curable resin, the step of curing the curable resin used as the above vehicle is applied depending on the properties of these resins subsequent to the printing step as a matter of course. The third step in the process for producing the decorative plate of the present invention is to coat and solidify a coating agent for formation of the top coating layer on the surface of the base paper for decorative sheet having the printed pattern layer in the laminate obtained in the above second step, thereby obtaining a top coating layer with concavities due to the liquid repellent performance possessed by the above printed pattern layer being formed at the portion corresponding to the above printed pattern layer.

Formation of the above top coating layer may be generally practiced by use of a coating agent which can be coated in liquid state and can form a transparent to translucent film layer by cooling, volatilization of the solvent, crosslinking, etc, after coating. For example, there may be utilized coating agents with the use of thermoplastic resins such as polyvinyl chloride, polyacrylic acid ester, polyvinyl acetate, cellulose derivatives (nitrocellulose, acetylcellulose, etc.), polyamide, polyacrylamide, or copolymers comprising two or more of these; thermosetting resins such as melamine-formaldehyde resin, phenol-formaldehyde resin, urea-formaldehyde resin, aryl resin, and unsaturated polyester resin; crosslinkable resins such as crosslinking type acrylic resins such as polymers, oligomers, monomers of acrylic acid ester, or crosslinking aid, or crosslinking type modified acrylic resin comprising urethane-modified product thereof, crosslinking type polyurethane resin containing acrylic polyol or polyester polyol and polyisocyanate, unsaturated polyester resin containing vinyl comonomer having functional groups, etc.

The coating agent composed mainly of the resin for formation of top coating layer as mentioned above and obtained by kneading sufficiently with a solvent after addition of necessary additives, may be coated according to a conventional coating method such as roll coating, gravure coating, air knife coating, flow coating, dip coating, spray coating, etc., generally to about 5 to 100 g (dry)/$m^2$, and preferably 10 to 50 g (dry)/$m^2$.

The solidification means of the coating layer for obtaining the top coating layer may be selected depending on the kind of the resin in the coating agent for formation of the above top coating layer. For example, cooling is applied in the case of the top coating with a thermoplastic resin, while heating is applied in the case of a thermosetting resin. Furthermore, in the case of a cross-linkable resin, if necessary, irradiation of UV-ray or electron beam, etc. is performed as a matter of course.

The top coating layer obtained in the above third step forms concavities at the portion corresponding to the printed pattern layer, because the coating agent coated in contact with the printed pattern layer in the base paper for the decorative sheet is repelled through the liquid repellent performance of said printed pattern layer, and in some cases, there may exist such a state in which a part or the whole of the surface of the printed pattern layer exhibits the state still exposed on the surface of the base paper for the decorative sheet with the concavity corresponding to the printed pattern layer formed on the top coating layer.

Production process (II)

The process for producing a decorative sheet having a corresponding embossed pattern of the present invention comprises the steps of forming a printed pattern layer by applying printing with a printing ink containing a curable resin as the vehicle on a base paper for the decorative sheet; subjecting the base paper for the decorative sheet attached with the above printed pattern layer to impregnation treatment with a resin liquid for the impregnation and drying the impregnated product, thereby obtaining a resin-impregnated sheet comprising a part or all of the surface of s id printed pattern layer being exposed through the liquid repellent performance possessed by the printed pattern layer containing the above curable resin as the vehicle and other portions being coated with the resin layer comprising the film of the resin used for the above resin liquid for impregnation; and forming a top coating layer by coating and solidifying a coating agent for formation of top coating layer on the whole surface of the printed pattern layer on which a part or whole of the surface in the above resin-impregnated sheet is exposed, thereby forming concave portions at the portions corresponding to said printed pattern layer through the liquid repellent performance possessed by the above printed pattern layer.

In the production process (II) of the decorative sheet of the present invention, as the base paper for the decorative sheet, for example, wood pulp of high α-cellulose purity and the so-called titanium paper mixed with pigments composed mainly of titanium oxide for imparting shielding property, above all suitably those enhanced in impregnation performance by suppressing heating degree, and it is preferable to use a base paper for the decorative sheet with a permeability of 12 seconds and a water absorption of 45 mm/10 min. or higher.

The second step of the production process of the decorative sheet of the present invention comprises subjecting the base paper for the decorative sheet attached with the above printed pattern layer to impregnation treatment with a resin liquid for impregnation and drying the impregnated product, thereby obtaining a resin-impregnated sheet comprising a part or all of the surface of said printed pattern layer being exposed through the liquid repellent performance possessed by the printed pattern layer containing the above curable resin as the vehicle and other portions being coated with the resin layer comprising the film of the resin used for the above resin liquid for impregnation. As the resin liquid for impregnation, there may be suitably employed a resin liquid composed mainly of a water-soluble acrylic resin, namely a resin mixture comprising a polyacrylic acid ester emulsion mixed with, for example, a synthetic rubber such as ethylene/butadiene copolymer, acrylonitrile/butadiene copolymer, a melamine resin, or an isocyanate resin.

As the above resin liquid for impregnation, from such points as permeability into the base paper for the decorative sheet, rapid drying characteristics and flexibility are brought about in the decorative sheet, a resin liquid containing 50% by weight or more of a polyacrylic acid ester emulsion is preferred, but emulsions of synthetic rubber other than those as mentioned above, thermoplastic resins such as polyvinyl acetate, polyvinyl chloride, etc., organic solvent solutions or aqueous solutions of curable resins such as unsaturated polyester resin, diaryphthalate resin, epoxy resin, phenol resin, polyurethane resin, melamine resin, benzoguanamine resin or urea resin can be also used. Furthermore, the above synthetic rubbers, thermoplastic synthetic resins, curable resins, etc. can be also used as a mixture of two or more kinds thereof.

Impregnation of the above resin liquid for impregnation can be easily performed with a resin liquid for impregnation diluted to a suitable viscosity with an appropriate solvent by utilizing roll coating, gravure coating, air knife coating, reverse coating, dip coating, Meyer's bar coating, etc., and it is preferable to effect impregnation so that the impregnation (%) represented by the following formula may become about 20 to 50:

$$\text{Impregnation (\%)} = \frac{\left(\text{Weight after impregnation}\right) - \left(\text{Weight before impregnation}\right)}{\text{Weight after impregnation}} \times 100$$

Preparation of decorative plate

In the process for producing a decorative plate of the present invention, the base paper for the decorative sheet having the above printed pattern layer obtained by the above production process (I) or (II) is plastered, using an adhesive, onto a substrate for a decorative plate prepared separately with the surface of the printed pattern layer in the above base paper for the decorative sheet being the outer surface, thereby obtaining a laminated product having the printed pattern layer surface in the above base paper for decorative sheet as the outer surface. For example, an adhesive such as phenol resin, resorsinol resin, urea resin, melamine resin, or polyvinyl acetate type emulsion may be utilized.

Effect of the invention

Accordingly, in the process for producing the decorative sheet of the present invention, the curing agent or catalyst in the printing ink in the printing step is under an inactivated state, and therefore printing can be performed under the state where printing ink, plate, doctor, etc. are held under a constant state, and by utilizing the liquid repellent ability possessed by the above printed pattern layer after curing of the curable resin in the printed pattern layer after completion of printing with the action of a curing agent, a top coating layer with the portion corresponding to said printed pattern layer portion being made concaved is formed. Hence, there can be obtained such effects that a decorative sheet with sharp concavities at the surface of the decorative sheet surface can be obtained with good efficiency, and that products of high quality can be obtained stably over a long time.

According to the above production process (II) of the present invention, in addition to the effects of the invention of the production process (I), there can be obtained the effect that a decorative sheet having properties of high interpaper strength of the decorative sheet, excellent solvent resistance, water resistance, abrasion resistance, weathering resistance, and heat resistance.

Also, in the production process of the present invention, as described above, since a base paper for decorative sheet provided with a printed pattern layer containing a curable resin as a vehicle, is adhered previously to a substrate for the decorative sheet prior to the formation of the top coating layer, as compared with a decorative plate obtained by adhesion of the decorative sheet having a top coating layer to a substrate for the decorative plate, the above top coating layer will not be affected by a defect in surface smoothness due to the surface irregularity of the substrate which is caused by penetration of the adhesive into the substrate for the decorative plate during solidification of the adhesive used for adhesion with the substrate for the decorative plate. Therefore there can be exhibited the effect that a decorative plate having excellent smoothness of the top coating layer surface is obtained.

Furthermore, in the process of the present invention, as described above, a base paper for the decorative sheet provided with a printed pattern layer containing a curable resin as the vehicle is adhered previously to a substrate for the decorative plate prepared separately prior to formation of the top coating layer, and therefore during formation of the top coating layer, the amount of the coating agent coated can be made larger. Therefore the decorative plate having a corresponding embossed pattern with an excellent unevenness effect can be obtained.

Specific constitutions of the process for producing the decorative sheet having embossed pattern of the present invention are described below by referring to Examples.

Example 1

On a base paper for a decorative sheet comprising tissue paper with a basis weight of 30 $g/m^2$, a wood grain pattern was gravure printed with a printing ink [i] of the composition shown below, Similarly, by use of a printing ink [ii] of the composition shown below, the printed pattern layer a the portion corresponding to the vessel portion of the grain was practiced according to the gravure printing method.

| Printing ink [i] | |
|---|---|
| (1) Nitrocellulose | 10 parts by wt. |
| (2) Pigment | 30 parts by wt. |
| (3) Solvent | 60 parts by wt. |
| **Printing ink [ii]** | |
| (1) Aminoalkyd resin | 50 parts by wt. |
| (2) Silicone | 10 parts by wt. |
| (3) Blocked p-toluenesulfonic acid | 10 parts by wt. |
| (4) Filler | 30 parts by wt. |
| (5) Solvent | 50 parts by wt. |

Subsequently, the base for decorative sheet having the above printing applied thereon was subjected to heating treatment at 150° C for 20 seconds, thereby effecting the curing treatment of the printed patter portion at the portion corresponding to the vessel portion of the wood grain through utilization of the curing action of p-toluenesulfonic acid.

Then, on the whole surface of the above printed surface, a coating agent with the composition shown below was coated at a ratio of 7 g (dry)/$m^2$ and further heated and dried at 150° C. for 30 seconds, to obtain a decorative sheet having a top coating layer in which the portion in contact with the printed pattern layer at the portion corresponding to the vessel portion of the wood grain is made concave, namely a corresponding embossed pattern.

| Coating agent composition | |
|---|---|
| (1) Methylomelamine/aqueous acrylic resin (weight ratio: 1:1) | 50 parts by wt. |
| (2) Silicone | 5 parts by wt. |
| (3) Silica | 5 parts by wt. |
| (4) Solvent | 10 parts by wt. |

Example 2

On a base paper for decorative sheet comprising a titanium paper [AX-1 (80), produced by Kojin K. K., Japan] with a basis weight of 30 $g/m^2$, a wood grain pattern was gravure printed with a gravure printing ink [i] of the composition shown below, and then similarly by use of a printing ink [ii] of the composition shown below, the printed pattern layer at the portion corresponding to the vessel portion of the grain was practiced according to the gravure printing method.

| | Gravure printinc ink [i] | |
|---|---|---|
| (1) | Cellulose acetate | 3 parts by wt. |
| (2) | Melamine resin | 3 parts by wt. |
| (3) | Coloration pigment | 20 parts by wt. |
| (4) | Dibutyl phthalate | 3 parts by wt. |
| (5) | Solvent | 78 parts by wt. |
| | Methanol | 15 parts by wt. |
| | Ethyl acetate | 60 parts by wt. |
| | Xylole | 15 parts by wt. |
| | Cyclohexanone | 10 parts by wt. |
| | **Printinq ink [ii]** | |
| (1) | Acryl polyol | 25 parts by wt. |
| (2) | Blood red | 10 parts by wt. |
| (3) | Silica gel powder | 10 parts by wt. |
| (4) | Ethyl acetate | 60 parts by wt. |
| (5) | Silicone | 5 parts by wt. |
| (6) | Isocyanate prepolymer | 10 parts by wt. |

Subsequently, after the printed pattern layer at the portion corresponding to the vessel portion of the wood grain pattern in the base for the decorative sheet having the above printing applied thereon was subjected to curing treatment, the sheet was impregnated with a resin liquid [iii] for impregnation having the composition shown below with an impregnation ratio of 30%, and further applied with drying treatment to obtain a resin-impregnated sheet.

| Resin liquid for impreqnation [iii] | |
|---|---|
| (1) Polyacrylic acid ester | 70 parts by wt. |
| (2) Styrene/butadiene copolymer | 20 parts by wt. |
| (3) Melamine resin | 10 parts by wt. |

Then, on the above printed pattern layer of the above resin-impregnated sheet, a coating agent, acrylic urethane for the formation of top coating layer [UM No. 20, produced by Morohoshi Ink K.K., Japan] was coated at a ratio of 10 g (dry)/$m^2$ according to the coating method by use of gravure rolls, followed further by coating to obtain a decorative sheet having a top coating layer with the surface of the printed pattern layer at the portion corresponding to the vessel portion of a woodgrain pattern being under the state exposed, and said printed pattern layer being made concave, namely the corresponding embossed pattern.

Example 3

On a base paper for a decorative sheet comprising a tissue paper with a basis weight of 30 g/$m^2$, a woodgrain pattern was gravure printed with a gravure printing ink [i] of the composition shown below, and then by use of a gravure printing ink [ii] of the composition shown below, formation of the printed pattern layer corresponding to the vessel portion of the woodgrain pattern was achieved according to the gravure printing method. The printed pattern layer at the portion corresponding to the above vessel portion has a liquid repellent performance.

| Gravure printing ink [i] | |
|---|---|
| (1) Nitrocellulose | 10 parts by wt. |
| (2) Pigment | 30 parts by wt. |
| (3) Solvent | 60 parts by wt. |
| Gravure printinq ink [ii] | |
| (1) Acryl polyol | 25 parts by wt. |
| (2) Silicone | 5 parts by wt. |
| (3) Isocyanate prepolymer | 10 parts by wt. |
| (4) Filler | 30 parts by wt. |
| (5) Solvent | 30 parts by wt. |

Subsequently, with the printed pattern layer surface of the woodgrain pattern in the base paper for the decorative sheet attached with the above printed pattern being as the outermost layer, said base paper for the decorative sheet was bonded to a substrate for a decorative plate comprising particle board with a thickness of 9 mm by use of an adhesive to obtain a laminated product.

Then, on the printed pattern layer surface of the base paper for the decorative sheet in the laminated product obtained above, a coating agent of the composition shown below was coated to a ratio of 25 g (dry)/$cm^2$ by use of the roll coater method, and further electron beam irradiation of 5 Mrad, 160 KV, 6 mA applied to said coated surface, thereby forming a top coated layer with the surface of the printed pattern layer at the portion corresponding to the vessel portion of the woodgrain pattern being under the state exposed to obtain the decorative sheet which is the desired product of the process of the present invention.

| Coating aqent [iii] | |
|---|---|
| (1) Polyester acrylate | 60 parts by wt. |
| (2) Trimethylpropane triacrylate | 30 parts by wt. |
| (3) Urethane monomer | 10 parts by wt. |

The decorative plate obtained has a top coating layer, with the surface of the printed pattern layer at the portion corresponding to the vessel portion of the woodgrain pattern being made under the state exposed, and said printed pattern layer portion being made concave, namely having an embossed pattern corresponding to the vessel portion of the woodgrain pattern, thus being endowed with a sharp unevenness effect, a smooth surface and depth sensation, and excellent surface characteristics.

What is claimed is:

1. A process for producing decorative sheets having an embossed pattern corresponding to a printed pattern layer, said process comprising the steps of:

forming a printed pattern layer on a base paper for the decorative sheet by use of a printing ink containing (a) a current agent or a polymerization catalyst and (b) a curable resin, the curing or catalytic action of said curing agent and polymerization catalyst being blocked and thereby inactivated, said printing ink being liquid repellent;

releasing the block state of said curing agent or polymerization catalyst thereby curing said curable resin in said printed pattern layer;

coating the whole surface of said printed pattern layer with a coating agent for the formation of a top coating layer; and solidifying said coating agent thereby forming the top coating layer of which the portions corresponding to the liquid repellent printed pattern layer are made concaved.

2. A process according to claim 1, wherein a polymerization catalyst is present and said catalyst, the catalytic action of which is blocked, is an amine salt of p-toluenesulfonic acid, and the curable resin is at least one resin selected from the group consisting of melamine resins, urea resins and alkyd resins.

3. A process according to claim 1, wherein a curing agent is present and said curing agent, the curing agent of which is blocked, is an isocyanate compound reacted with a blocking agent, and said curable resin is an urethane resin.

4. A process according to claim 1, wherein a curing agent is present and said curing agent, the curing action of which is blocked, is a microencapsulated aminated compound, and said curable resin is an epoxy resin.

5. A process according to claim 1, further comprising the steps of impregnating said base paper with a resin liquid and drying the impregnated base paper prior to formation of said top coating layer.

6. A process for producing decorative plates having an embossed pattern corresponding to a printed pattern layer, said process comprising the steps of:

forming a printed pattern layer on a base paper by use of a printing ink containing (a) a curing agent or a polymerization catalyst and (b) a curable resin, the curing or catalytic action of said curing agent and polymerization catalyst being blocked and thereby inactivated, said printing ink being liquid repellent;

releasing the block state of said curing agent or polymerization catalyst thereby curing said curable resin in said printed pattern layer;

plastering said base paper to a substrate for the decorative plates via an adhesive layer;

coating the whole surface of said printed pattern layer with a coating agent for the formation of a top coating layer; and solidifying said coating agent thereby forming the top coating layer of which the portions corresponding to the liquid repellent printed pattern layer are made concaved.

7. A process for producing decorative plates having an embossed pattern corresponding to a printed pattern layer, said process comprising the steps of:

forming a printed pattern layer on a base paper by use of a printing ink containing (a) a curing agent or a polymerization catalyst and (b) a curable resin, the curing or catalytic action of said curing agent and polymerization catalyst being blocked and thereby inactivated, said printing ink being liquid repellent;

releasing the block state of said curing agent or polymerization catalyst thereby curing said curable resin in said printed pattern layer;

impregnating said base paper with a resin liquid;

drying the impregnated base paper;

plastering said base paper to a substrate for the decorative plates via an adhesive layer;

coating the whole surface of said printed pattern layer with a coating agent for the formation of a top coating layer; and solidifying said coating agent thereby forming the top coating layer of which the portions corresponding to the liquid repellent printed pattern layer are made concaved.

* * * * *